Oct. 11, 1966 H. L. BEUCLER ETAL 3,278,056
CONVEYOR TRUCK-TRAILER
Filed Nov. 12, 1963 3 Sheets-Sheet 1
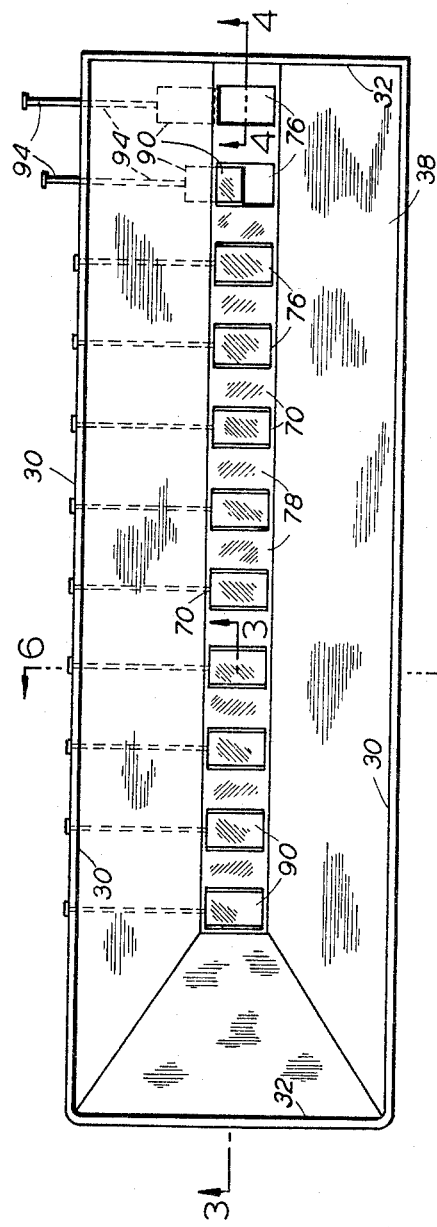
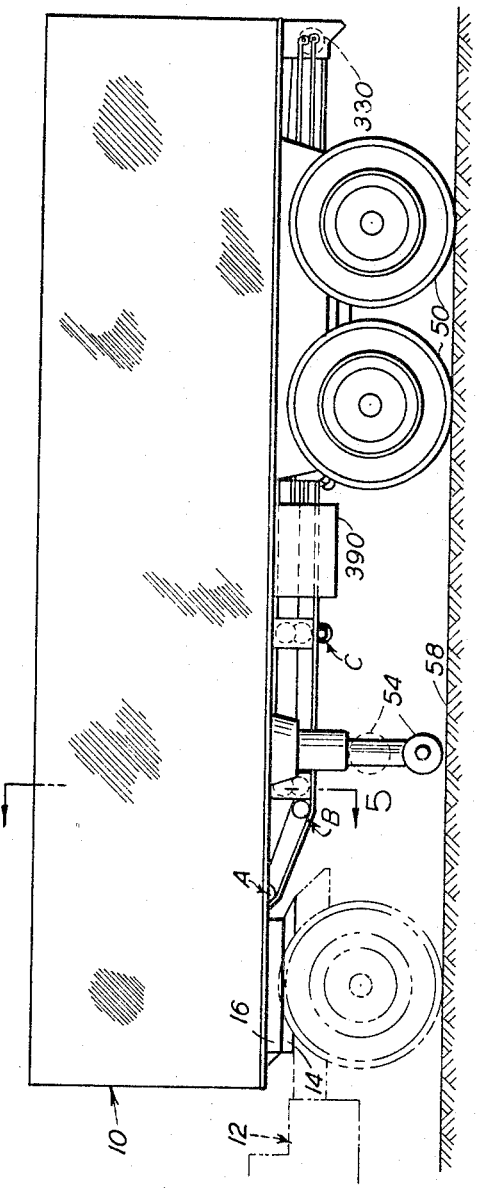
INVENTORS
HARLAN L. BEUCLER
JIMMIE S. GARDNER
BY
Hiram A. Sturges,
Agent Oct. 11, 1966    H. L. BEUCLER ETAL    3,278,056
CONVEYOR TRUCK-TRAILER
Filed Nov. 12, 1963    3 Sheets-Sheet 2
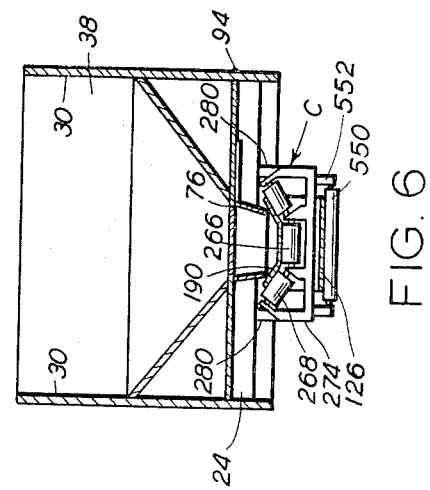
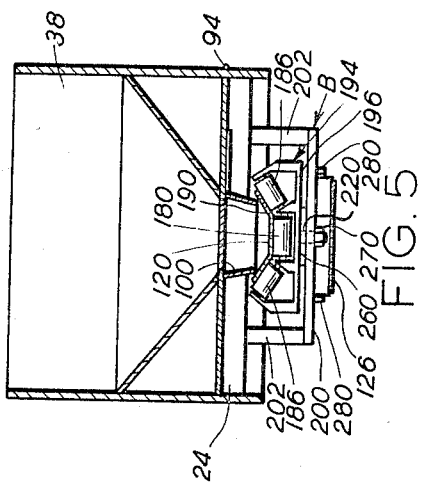
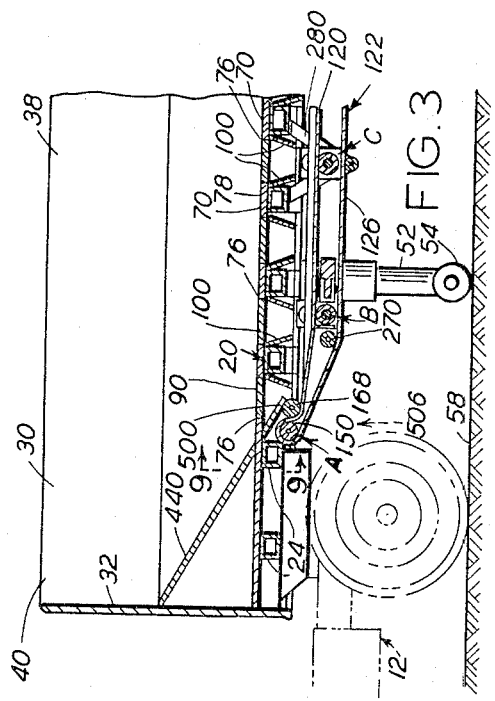
*INVENTORS*
HARLAN L. BEUCLER
JIMMIE S. GARDNER
BY
*Hiram A. Sturges,*
*Agent*

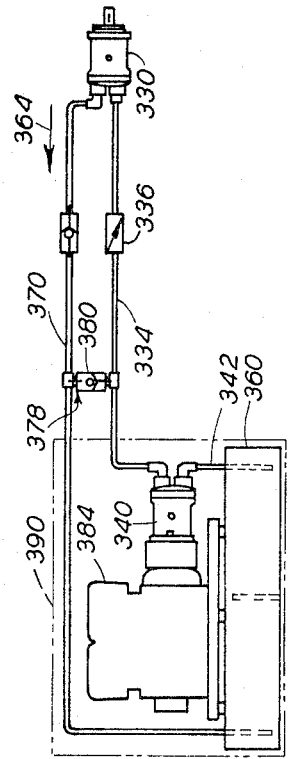
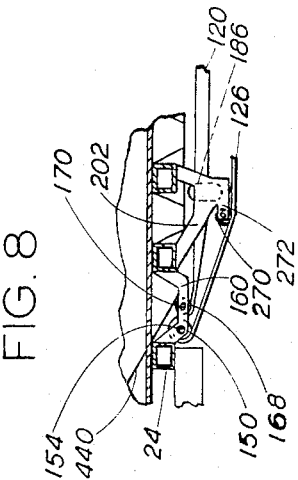
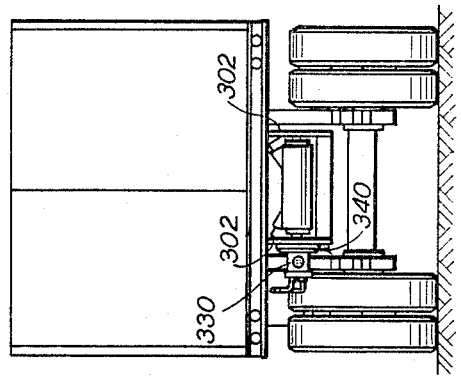
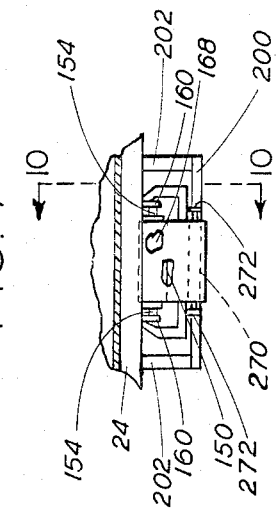
INVENTORS
HARLAN L. BEUCLER
JIMMIE S. GARDNER

United States Patent Office 3,278,056
Patented Oct. 11, 1966

3,278,056
CONVEYOR TRUCK-TRAILER
Harlan L. Beucler, 7730 Charles St., and Jimmie S. Gardner, 7615 Spring St., both of Omaha, Nebr.
Filed Nov. 12, 1963, Ser. No. 322,787
3 Claims. (Cl. 214—83.2)

This invention relates to trucks for transporting bulk materials such as rock salt crystals, pelleted feed, fertilizer, potates, and other vegetables, and rocks of various kinds such as crushed rock, coarsely ground limestone, and sand. More particularly it is an object to provide concepts which make it possible to unload such trucks by conveyor much more rapidly and effectively than heretofore.

At the present time a very, very small percentage of the trucks used for carrying such bulk products have been belt conveyor trucks because belt conveyor trucks have been proven to have high maintenance costs, very frequent mechanical failure with resultant costly down time, and very slow unloading as has also involved very high labor costs.

As a result of these disadvantages, by far the largest majority of open top trucks conveying such cargoes in large loads are unloaded by means of scoop shovels, old-fashioned but dependable.

A very, very small percentage of such loads are carried by dump trailers inasmuch as they are too expensive, too heavy, of too much height, and yield too low a revenue per mile.

Prior art attempts to solve these problems with auger conveyors have not been satisfactory for many reasons: an auger breaks up pelleted feed or fertilizer, causing it to be crumblized and creating what is called in the art a "fines" problem.

An auger tends to grind the salt cargo, undesirably powderizing much of it, and the abrasive action of the salt tends to wear out the auger housing and auger blades; further, an auger tends to retain parts of an earlier load and cause it to be mixed with parts of a later load since an auger will not clean itself out, as can result, for example, in salt mixed with feed and feed mixed with salt.

It is, therefore, one object of this invention to provide a belt conveyor truck constructed in a manner such that the conveyor tends to clean itself out to avoid undesirable mixing of loads.

The salient objective of this invention is to provide a conveyor truck, the conveyor of which is mounted below the truck frame to avoid a costly loss of cargo space that has attended the mounting of belt conveyors above the truck frame and below a special floor spaced above the truck frame in order to accommodate a belt conveyor between the special floor and the truck frame. As such a special floor must be extremely strong in order to carry the full load weight of a cargo, it is a further objective to provide a way to avoid the extremely high cost of such a special extra floor and the framework required to support such a special floor above the main frame of the truck which latter is called the main frame because it is attached to the wheel-carrying elements, and which, in a truck trailer, is attached to and supports the fifth wheel pin.

A further very important feature of this invention is in the passing of the cargo down through the main frame of the truck and between transverse frame members onto a belt conveyor disposed thereabeneath.

Whereas heretofore it has perhaps been thought necessary that a conveyor belt be disposed above the main frame of a truck and in a position such that slanted floor members can guide cargo to the conveyor belt, it is an object of this invention to provide the concept of guiding the cargo to the conveyor belt by means of special chutes extending from openings in the standard floor of the trailer downwardly sufficiently close to the conveyor belt that, with the conveyor belt being of the type supported by upwardly inclined side rollers and the chutes terminating inwardly of the sides of the conveyor belt, the combination prevents spillage of cargo over the sides of the belt and makes possible the placement of the belt beneath the truck frame where valuable cargo space is conserved.

Conveyor truck-trailers presently in use have required the dragging of the upper belt across the top of a super-floor in order that the super-floor support the belt, as has caused such high friction between belt and supporting floor that we have found that the use of a roller supported belt, as is made practical by our concept, will reduce friction sufficiently that a one-horse power motor will move a twenty-four inch belt mounted in accordance with this invention as fast as a thirty-five horse power motor will move a twenty-inch belt that is frictionally supported by a floor.

We do not, of course, claim to have invented the use of rollers with a conveyor, but we have invented, we believe, a concept of conveyor below-the-main-or-lowest-frame arrangement which makes possible the use of rollers for the first time in the bulk-truck field without conveyor-clogging. Prior art attempts to use rollers have been largely unsuccessful because rollers in the "above-the-main-or-lowest-frame position" have clogged. This clogging has been caused by leakage of cargo past the sides of such belts to cause "cargo-buildup" underneath the conveyor leading to eventual jamming of the rollers as are cleanable in the prior art only by expensive dismantling. We avoid "cargo-buildup" underneath the upper belt by special chutes with special chute positions close to the belt.

A further object of the invention is to provide low maintenance costs by making it possible to remove and replace rollers by relaxing belt tension without the need to remove an entire belt as is necessary in the repair of super-floor-supported belt-type conveyors.

A further object is to provide a trailer, the various parts of the cargo of which can be unloaded simultaneously as is made possible by movable or sliding traps or gates disposed above each of the chutes.

A further object is to provide a truck as described, the belt conveyor of which is mounted on groups of transversely extending rollers mounted on brackets which are not interconncted whereby the truck frame itself is used as the only frame for the conveyor so that as the truck frame twists during travel, the roller-supported brackets can twist with the truck frame freely to the end that there is no separate and rigid conveyor frame that might otherwise break as a truck frame twists, for avoiding costly rigid-conveyor-frame breakage.

A further object of the invention is to provide means for terminating a lower portion of the conveyor rearwardly of a forward area under a truck-trailer which is normally occupied by the king-pin and fifth-wheel-engaging-plate portion of the trailer, in further combination with inclined baffle means for delivering cargo from space above the king-pin area to the forward portion of the conveyor to avoid manual unloading of the forward end of the trailer.

A particular objective is to reduce the weight of the cargo trailer because the weight limits set by law are based on total weight of trailer and load. With high fuel costs, high fixed costs, driver costs, and loading and unloading labor costs, the extra cargo payload made availably by a low trailer weight becomes an economic gold mine.

An objective of importance in the nation's trucking economy is to provide a conveyor truck with the advantages above described which can be made by conversion of a standard truck of the kind now in common use, whereby the many standard trucks of this type need not be made obsolete.

Another object of the invention is to provide a downwardly and rearwardly inclining cargo-directing baffle extending across the upper side of the floor above the fifth wheel area of a semi-trailer for directing cargo downwardly and rearwardly by gravity through a chute and onto a conveyor for rapidly delivering cargo from the forward end of a truck since the conveyor cannot extend forwardly in the position in which it would interfere with operation of the fifth wheel of a towing truck-tractor.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of a truck-trailer of this invention, a rearward portion of a truck-tractor being partially shown in dotted lines.

FIGURE 2 is a top plan view of the trailer of FIGURE 1 shown with one of the traps open and another partially open, and with the rest shown in closed positions.

FIGURE 3 is a sectional view of the trailer of FIGURE 2 as seen along the lines 3—3 of FIGURE 2 and showing a rear portion of a towing tractor in dotted lines.

FIGURE 4 is a sectional view taken along the line 4—4 of FIGURE 2 showing a rearward portion of the trailer.

FIGURE 5 is a sectional view taken along the line 5—5 of FIGURE 1.

FIGURE 6 is a sectional view taken along the line 6—6 of FIGURE 2.

FIGURE 7 is a rearward end view of the trailer of FIGURE 1.

FIGURE 8 is a detail showing the power unit of the trailer with the housing for the motor thereof being shown in dotted lines.

FIGURE 9 is a view-in-section taken substantially along the line 9—9 of FIGURE 3.

FIGURE 10 is a sectional view along the line 10—10 of FIGURE 9.

Referring to the drawings, in FIGURE 1 a truck-trailer of the bulk cargo carrying type is generally indicated at 10 and can also be referred to as a bulk cargo containing vehicle 10, inasmuch as the principles described herein are not necessarily limited to trailers alone.

The trailer 10, as shown in FIGURE 1, is attached to the rearward portion of a truck-tractor shown in dotted lines at 12 and having a fifth-wheel assembly 14 shown in full lines in FIGURE 1, upon which a fifth-wheel engaging plate or member 16 is received in a conventional manner.

As best seen in FIGURE 3 and in FIGURE 4, the trailer 10 has a generally horizontally extending main frame, generally indicated at 20, and formed of a plurality of longitudinally spaced transversely extending floor joists 24, which latter are fixed at their ends in a conventional manner to side walls 30 of the trailer, the latter being attached to end walls 32 at the forward and rearward ends of the trailer for defining a cargo space 38, preferably having an open top, as indicated at 40 for receiving heavy bulk cargo.

The horizontal main frame 20 is composed of the floor joists 24 in conjunction with the side walls 30 and 38, which latter provide longitudinal strength fo rthe frame 20.

As the upper and lower surfaces of the floor joists 24 are commonly in alignment with each other, being disposed with the upper sides in one horizontal plane and with their lower sides in another horizontal plane, it can be said that the frame 20 is therefore exactly horizontally extending, although for purposes of this invention it can be of many shapes consistent with the principles herein, although for more convenient reference the frame 20 shall sometimes herein be described as generally horizontally disposed.

The main frame 20 can be distinguished as a main frame further by the fact that it is the frame which disposed closest to the trailer supporting wheels 50, best seen in FIGURE 1, at the rearward end of the trailer, and also disposed closest to the conventional support wheel assembly 52, which is disposed under the forward end of the trailer and which latter is adapted to telescope in a conventional manner for withdrawing its wheel 54 upwardly into a retracted road travel position, shown in dotted lines in FIGURE 1, well above the ground level 58.

That is to say, the frame 20 can be identified as the main frame of the trailer, because there is no other horizontally extending support frame of the trailer disposed between the frame 20 and the fifth-wheel engaging plate 16.

The reason for designating the frame 20 as a main frame, is to distinguish it from super-frames of the prior art which have been disposed above and rested on the main or lower frame in prior art trailers, whereby such super-frames have supported super floors for carrying cargo.

The main frame 20 supports a horizontal main floor 70, which, as best seen in FIGURES 2 and 3, is provided with openings means defined by a plurality of longitudinally spaced openings 76 which latter are adapted to receive bulk cargo vertically therethrough.

The openings 76 are disposed between those portions of the floor 70 which are seen at 78 as being above the floor joists 24.

Each opening 76 is provided with a movable or sliding trap 90 which is adapted to completely close the respective openings 76 and which latter are movable for completely opening the openings 76 at times for unloading.

As best seen in FIGURE 2, each sliding trap or trap means 90 is provided with a control member or control means 94 attached thereto and preferably extending transversely of the trailer, with the control members 94 being elongated and extending horizontally and with their outer ends projecting beyond a respective side wall 30 of the trailer, whereby their ends are in easily accessible positions on the outer side of the cargo space 38 defined by the side and end walls 30 and 32.

Each gate 90 is adapted to be slidably supported by suitable means such as, for example, the upper edges of respective chutes 100, which latter are disposed beneath respective openings 76, extending downwardly therefrom into positions disposed closely adjacent but spaced from the upper side of the upper portion 120 of a conveyor belt, gradually indicated at 122, the conveyor belt being endless and having its upper portion 120 adapted to move rearwardly for the unloading of the trailer, the conveyor 122 having also a lower portion 126 which is adapted to move forwardly as a return portion of the conveyor.

The chutes 100 have upper ends of like shape and size with the edges of the openings 76, although the sides of the chutes 100, that is both the forward, rearward and right and left sides of the chutes 100 are all preferably tapered inwardly, whereby the lower outlet of each chute 100 is of a lesser size than their respective openings 76.

As best seen in FIGURES 5 and 6, the upper section 120 of the conveyor belt is concave and is provided with a longitudinal trough and the right and left sides of the respective chutes 100 preferably have their lower ends terminating inwardly of the right and left sides of the upper conveyor sections 120 so as to tend to prevent overflow of the conveyor section 120 during unloading.

It is particularly to be noticed that the conveyor 122 is disposed below, not above, the main frame 20 of the trailer, and if the main frame 20 be defined as the lowermost horizontally extending frame of the trailer in the hereinafter appended claims, then the conveyor 122 will be largely found to be disposed below the said lowermost horizontally extending frame 20 of the trailer, as distinguished from prior art concepts.

Referring to FIGURES 3 and also to FIGURE 4, it will be seen that the conveyor belt 122 is supported by a plurality of groups of rollers, a forward group generally indicated at A, comprising a forwardmost roller 150, having an axle 154, best seen in FIGURE 9, the ends of the axle 154 being connected to frame members 160 of the conveyor 122, and the frame members 160 are themselves connected to and suspended between two adjacent ones of the floor joists 24, the said two adjacent floor joists 24 being those that are disposed forwardly and rearwardly of the roller 150.

The roller group A further has a belt down-pressing roller 168 disposed rearwardly of the roller 150 and disposed above the upper portion 120 of the belt.

The belt-down-pressing roller 168 has an axle 170, ends of which are rotatably received in the conveyor frame members 160 and it will be understood that the belt 122 extends upwardly around the forward side of the forward roller 150 and then downwardly under the roller 168 and thence rearwardly as the upper belt portion 120.

The conveyor 122 has a second group of rollers generally indicated at B which, as best seen in FIGURE 5, comprises a central supporting roller 180 disposed under the middle of the upper part 120 of the belt 122.

The group B further has two side supporting rollers 186 on each side of the roller 120 and disposed each inclining upwardly from the roller 180 toward the opposite ends of the roller 186 for causing the upper belt portion 120 to have a trough 190 defined on its upper side.

The side rollers 186 can also be called side supporting rollers. The supporting rollers 180 and 186 are rotataby mounted in a supporting roller carrier 194, which latter has a horizontal portion 196 extending under the rollers 180 and 186, and above a group B lateral frame member or roller assembly supporting frame member 200, which extends horizontally and laterally of the vehicle, being itself attached to and supported by hangers 202, which are connected to the two closest ones of the floor joists 24, as best seen in FIGURE 5.

The connection between the roller carrier horizontal member 196 and the conveyor roller assembly supporting frame member 200 is made by a vertical bolt 220, rotatably mounting the carrier 196 on the frame member 200 for swinging movements of the carrier member 194 on a washer 260.

The advantage of this swinging movement is to permit the conveyor belt to adjust itself for any stretching or twisting thereof that might occur.

Referring to FIGURE 3, the roller group B also has a hold-down roller 270 attached by its axle to brackets 272, which latter are in turn attached to the conveyor frame transverse member 200, as best seen in FIGURE 5.

Referring again to FIGURE 3, a roller group C is generally shown and is still more specifically shown in FIGURE 6 and comprises a central roller 266 which is a support roller, two inclined side rollers 268 for providing the trough 190 in the upper belt portion 120, a roller carrier 274 carrying the support rollers 266 and 268 and conveyor frame members 280 attached to the carrier 274 and suspending it from adjacent floor joists 24.

Between the forward portion of the vehicle, shown in FIGURE 3 and the rearward portion shown in FIGURE 4, there will be understood to be many other roller groups similar to the roller group C.

Referring to FIGURE 4, a rearwardmost roller or drive roller 300 is there shown comprising by itself a roller group D. The roller 300 being mounted rotatably on brackets 302 suspending it from the rearwardmost floor joist 24.

Referring to FIGURE 7, a hydraulic drive motor is shown at 330 and it is suitably drivably connected to the axle of rear drive roller 300 by means of suitable interconnection means generally indicated at 340.

As best seen in FIGURE 8, the drive motor 330 receives its power through a fluid drive line 334 having in it a valve 336, the line 334 leading from a hydraulic pump 340 which latter receives hydraulic fluid by pumping it through the line 342 from a reservoir of hydraulic fluid shown at 360. Hydralic fluid leaving the motor 330 moves in the direction of the arrow 364 along a fluid return line 370 which returns to the reservoir 360. A bypass line generally indicated 378 interconnects the lines 334 and 370 and has in it a valve 380 for facilitating the by-passing of hydraulic fluid under pressure from the line 334 directly to the line 370 so that the pump 340 can run at high speed at times when it is desired that the motor 330 run at a low speed.

The pump 340 is operated by an engine 384, which latter is independent of the towing vehicle 12.

The engine 384, pump 340, and reservoir 360, are all preferably mounted in housing 390, which latter is attached to and suspended from floor joists 24, the housing 390 being disposed between the rear wheels 50 of the vehicle 10 and the support wheels 54 thereof.

As is conventional in such large load-carrying vehicles, the vehicle or trailer 10 is provided with inclined bottom blades 420 disposed on the right and left sides of its cargo space 38 and inclining downwardly and inwardly from the sides 30 of the trailer, as best seen in FIGURE 6, the lower ends of the plates 420 terminating at the respective outer sides of the respective openings 76 for the delivery or funneling of cargo downwardly toward the openings 76.

A similar forward plate 440 extends downwardly and inwardly from a midpoint on the forward wall 32 downwardly and rearwardly to a point adjacent the forward side of the forwardmost opening 76 for funneling cargo toward the forwardmost opening 76.

Beneath the forwardmost opening 76 a special baffle 500 is provided, as best seen in FIGURE 3, the special baffle inclining downwardly and rearwardly from the forward side of the forwardmost opening 76, where it is attached to the floor 70 in suitable fashion, toward its rearward end which is disposed adjacent the rearward side of the hold-down roller 168. The baffle 90 being disposed above the hold-down roller 168 so as to direct cargo falling through the forwardmost opening 76 downwardly and rearwardly onto the belt upper portion 120.

The baffle 500 forms actually the forward wall of the forwardmost one of the chutes 100 earlier mentioned.

In operation, it will be seen that a heavy load can be carried with stability and greater safety because of the low center of gravity and that when it is desired to remove the load, the engine 384 can be started so that the conveyor 122 is driven with its upper portion 120 moving rearwardly.

Thereupon any selected one of the gates 90 or a plurality of the gates 90 can be opened. Cargo will flow through the chutes 100 to the trough 120 of the upper conveyor belt and will be delivered rearwardly over the rearwardmost portion of the conveyor.

The opening of the gate 90 will be easy because the operator need not dig down through the cargo to move a gate 90, but can instead control the gate 90 from the side of the trailer at which its respective control member 94 is easily accessible.

During road travel, there will be no danger for a conveyor frame to break under heavy loads due to the twisting of a main frame because any conveyor frame elements are not interconnected with all frame roller groups, but in fact, each frame roller group A, B, C and D is connected to the frame of the vehicle substantially independently of each other group of rollers, whereby each group of rollers is sufficiently disconnected from each other group of rollers so that the frame of the vehicle cannot by its twisting cause breakage of any conveyor frame elements.

The chutes 100 will be found to extend downwardly sufficiently close to the upper section 120 of the conveyor belt as to cooperate with the depth of the trough 120 of the conveyor belt so as to effectively prevent cargo from escaping over the sides of the conveyor belt portion 120.

Referring to FIGURE 3, it will be seen that forward end of the conveyor 122 has the forward roller 150 about which the conveyor belt turns, the forward end of the upper portion 120 of the conveyor being disposed substantially spaced above the remainder of the upper portion 120 of the conveyor, and the hold-down roller 168 is positioned upon the conveyor belt rearwardly of and adjacent the forward roller 150 for causing the upper side of the forward portion of the conveyor to be pressed downwardly substantially beneath the upper side of the forward roller 150, whereby the under portion of the belt 126 can be upwardly disposed to a maximum height, or to a maximum extent, or closer to the frame to provide clearance for the rearward parts 506 of the truck-tractor 12.

Unloading will be found to be very swift because the conveyor belt is protected from the great mass of the tonnage load of the cargo by the floor 70 and the conveyor belt need support, therefore, only such amounts of rock as press on the conveyor belt through the openings 76 plus the load of rock being carried by the belt in other areas along its upper surface, this latter being secondary.

Referring to FIGURE 6, it will be seen that the roller group C has a support roller beneath and supporting the lower belt section 126. The roller 126 is mounted on brackets 552 attached to roller carrier 274.

There are many longitudinally spaced roller groups C, not shown, between the Group C shown and the group D shown.

The bulk load-carrying vehicle of this invention is believed to fulfill the objectives above set forth and particularly to provide a vehicle of the longitudinal conveyor type which is more economical to manufacture because it need not have an extra frame below its conveyor for attachment to the wheels, and because its conveyor power supply system need not be so expensive because of the much lesser power required for unloading, which will unload more swiftly, which is more durable and dependable and more free from breakdowns, which preserves cargo space to the maximum and preserves low center of gravity because of its elimination of an extra frame.

From the foregoing description, it is thought to be obvious that a conveyor truck-trailer constructed in accordance with our invention is particularly well adapted for use, by reason of the convenience and facility with which it may be assembled and operated, and it will also be obvious that our invention can be changed and modified without departing from the principles and spirit thereof, and for this reason, we do not wish to be understood as limiting ourselves to the precise arrangement and formation of the several parts herein shown in carrying out our invention in practice, except as claimed.

We claim:

1. A bulk load carrying vehicle, said vehicle being elongated in the direction of travel and having a generally horizontally and longitudinally extending elongated main frame, supporting wheels disposed beneath said main frame, means connecting said wheels supportably to said main frame, an elongated belt conveyor extending longitudinally of and generally beneath said frame, conveyor supporting means movably supporting said conveyor, there being substantially no other frame between said main frame and said wheels whereby said frame is indeed the main frame of said vehicle and whereby said conveyor is on the same side of said main frame as said wheels, means attaching said conveyor supporting means to said frame, side walls and end walls extending upwardly from said frame for enclosing the sides and ends of a cargo space defined therebetween, a floor disposed across the upper side of said frame, said floor having opening means extending vertically therethrough, openable trap means for closing said opening means, means movably mounting said openable trap means with respect to said frame for permitting the opening and closing of said openable trap means, and control means connected to said trap means for causing said trap means to open at desired times to permit cargo to fall through said openings, said belt extending longitudinally of said vehicle beneath said opening means, said means attaching said conveyor supporting means to said main frame not forming a part of said means connecting said vehicle wheels supportably to said main frame.

2. The combination of claim 1 in which said conveyor support means comprises a plurality of roller assemblies comprising groups of longitudinally spaced belt-supporting rollers, a plurality of roller supporting frame members spaced longitudinally of said vehicle and secured to said main frame, means rotatably connecting each said group of rollers to a respective roller assembly supporting frame member for operably rotating with belt movements, and said roller supporting frame members being sufficiently disconnected from each other that the main frame of said vehicle serves as the principal support for said roller assembly supporting frame members whereby as said vehicle frame twists as is normal during road travel said roller assembly supporting frame members will be free to move in unison with adjacent respective parts of said vehicle main frame and substantially independently of each other for avoiding breakage that might ottherwise occur from the force of such twisting if the roller assembly supporting frame member at each group of rollers was rigidly connected by means other than said main frame to other parts of said connecting means at other groups of rollers.

3. The combination of claim 2 in which said means forming a part of each roller assembly and rotatably connecting each group of said rollers to the respective roller supporting frame member comprising one of a plurality of roller carriers each connected to and mounted on a respective roller supporting frame member in a manner for rotation with respect thereto about a vertical axis beneath approximately the transverse center of said belt, and certain of said rollers being rotatably mounted on a respective roller carrier.

References Cited by the Examiner
UNITED STATES PATENTS

| | | | |
|---|---|---|---|
| 860,942 | 7/1907 | Schwartz | 198—54 |
| 2,275,799 | 3/1942 | Oklejas | 214—83.2 X |
| 2,278,730 | 4/1942 | Neuman. | |
| 2,576,781 | 11/1951 | Curioni. | |
| 2,805,784 | 9/1957 | Dokken | 214—83.36 |
| 3,107,804 | 10/1963 | Cox | 214—83.36 X |

GERALD M. FORLENZA, *Primary Examiner.*

A. J. MAKAY, *Assistant Examiner.*